United States Patent
Peiker

(10) Patent No.: US 9,136,895 B2
(45) Date of Patent: Sep. 15, 2015

(54) ARRANGEMENT FOR COUPLING A MOBILE PHONE TO AN EXTERNAL ANTENNA

(75) Inventor: Andreas Peiker, Friedrichsdorf (DE)

(73) Assignee: Peiker Acustic GmbH & Co. KG, Friedrichsdorf (DE)

( * ) Notice: Subject to any disclaimer, the term of this patent is extended or adjusted under 35 U.S.C. 154(b) by 388 days.

(21) Appl. No.: 13/270,610

(22) Filed: Oct. 11, 2011

(65) Prior Publication Data

US 2012/0062441 A1 Mar. 15, 2012

Related U.S. Application Data

(63) Continuation of application No. PCT/EP2011/000656, filed on Feb. 11, 2011.

(30) Foreign Application Priority Data

Feb. 13, 2010 (DE) .......................... 10 2010 008 030

(51) Int. Cl.

| | |
|---|---|
| H01Q 1/32 | (2006.01) |
| H01Q 7/00 | (2006.01) |
| H04B 1/3822 | (2015.01) |
| B60R 11/02 | (2006.01) |
| H01Q 1/24 | (2006.01) |
| H01Q 1/38 | (2006.01) |
| H01Q 1/52 | (2006.01) |
| H01Q 21/28 | (2006.01) |
| H04B 1/3877 | (2015.01) |
| H02J 7/00 | (2006.01) |

(52) U.S. Cl.
CPC .......... *H04B 1/3822* (2013.01); *B60R 11/0241* (2013.01); *H01Q 1/242* (2013.01); *H01Q 1/248* (2013.01); *H01Q 1/3291* (2013.01); *H01Q 1/38* (2013.01); *H01Q 1/526* (2013.01); *H01Q 7/00* (2013.01); *H01Q 21/28* (2013.01); *H04B 1/3877* (2013.01); *H02J 7/00* (2013.01)

(58) Field of Classification Search
CPC .. H04B 1/3877; H04B 1/3833; H04B 1/0458; H04B 1/3888; B60R 11/02; B60R 11/0241; B60R 2011/0075; H04M 1/6075
USPC .......... 343/702, 700 MS, 793, 794, 795, 801, 343/802, 806, 809, 810, 711, 713, 818, 841
See application file for complete search history.

(56) References Cited

U.S. PATENT DOCUMENTS

| | | | | |
|---|---|---|---|---|
| 5,493,702 | A | * | 2/1996 | Crowley et al. ............ 455/575.5 |
| 5,867,131 | A | * | 2/1999 | Camp et al. ................... 343/797 |

(Continued)

FOREIGN PATENT DOCUMENTS

| | | |
|---|---|---|
| DE | 10 2006 034 128 A1 | 10/2007 |
| DE | 10 2007 044 294 A1 | 12/2008 |

(Continued)

*Primary Examiner* — Hoang V Nguyen
*Assistant Examiner* — Patrick Holecek
(74) *Attorney, Agent, or Firm* — Burr & Brown, PLLC

(57) ABSTRACT

The invention relates to an arrangement for coupling an antenna, which is in the form of a transmitting and/or receiving antenna, of a mobile telephone to an external antenna or an arrangement for accommodating a mobile telephone from amongst a large number of different mobile telephones in a vehicle with low levels of loss and interference radiation, and for coupling the respective mobile telephone to devices of the vehicle.

16 Claims, 4 Drawing Sheets

(56) References Cited

U.S. PATENT DOCUMENTS

| | | |
|---|---|---|
| 6,538,607 B2 * | 3/2003 | Barna .......................... 343/702 |
| 7,110,537 B2 | 9/2006 | Mazzara, Jr. |
| 7,180,503 B2 * | 2/2007 | Burr et al. .................... 345/163 |
| 7,202,819 B2 * | 4/2007 | Hatch .................... 343/700 MS |
| 7,259,722 B2 * | 8/2007 | Strauss et al. ................. 343/702 |
| 7,409,235 B2 * | 8/2008 | Cordella et al. ........... 455/569.2 |
| 8,238,984 B2 * | 8/2012 | Pursche et al. .............. 455/575.1 |
| 2004/0095280 A1 * | 5/2004 | Poilasne et al. ............... 343/702 |
| 2004/0202312 A1 | 10/2004 | Mazzara, Jr. |
| 2007/0178754 A1 | 8/2007 | Schlegel et al. |
| 2009/0305746 A1 | 12/2009 | Pursche et al. |

FOREIGN PATENT DOCUMENTS

| | | | |
|---|---|---|---|
| EP | 0 999 607 A2 | 5/2000 | |
| EP | 1 006 606 A1 | 6/2000 | |
| EP | 1 170 822 A1 | 1/2002 | |
| EP | 1 489 682 A1 | 12/2004 | |
| GB | 2 407 448 A | 4/2005 | |
| GB | 2407448 A * | 4/2005 | .............. H04M 1/04 |
| WO | 2004/095634 A2 | 11/2004 | |
| WO | 2007/118694 A1 | 10/2007 | |
| WO | 2008/085503 A2 | 7/2008 | |

* cited by examiner

ARRANGEMENT FOR COUPLING A MOBILE PHONE TO AN EXTERNAL ANTENNA

CROSS REFERENCE TO RELATED APPLICATIONS

This application is a continuation of International Application No. PCT/EP2011/000656 filed Feb. 11, 2011, which designated the United States, and claims the benefit under 35 USC §119(a)-(d) of German Application No. 10 2010 008 030.6 filed Feb. 13, 2010, the entireties of which are incorporated herein by reference.

FIELD OF THE INVENTION

The invention relates to an arrangement for coupling an antenna, which is in the form of a transmitting and/or receiving antenna, of a mobile telephone to an external antenna with low levels of loss and interference radiation, and to an arrangement for accommodating a mobile telephone from amongst a large number of different mobile telephones in a vehicle and for coupling the respective mobile telephone to devices of the vehicle.

BACKGROUND OF THE INVENTION

WO 2007/118694 A1 describes a specific antenna arrangement which permits coupling to a transmitting/receiving antenna of a mobile telephone in an accommodation space, but a specific mount for the mobile telephone is necessary in order to achieve effective coupling to the antenna of the mobile telephone. Each mobile telephone has a different antenna structure and usually also a different arrangement of the antenna in the housing of the mobile telephone. These specific differences will be compensated for here by the mount allowing different positions, depending on the external dimensions of the mobile telephone and the antenna arrangement in the mobile telephone.

WO 2004/095634 A2 describes a vehicle mount for a mobile telephone, which vehicle mount has, in addition to the coupling antenna in this specific mount, elements for reflecting and damping the RF radiation which are intended to prevent interference radiation in the vehicle. The subject matter of U.S. Pat. No. 7,110,537 B2 is similar- shielding of the accommodation space for the mobile telephone in the vehicle.

All of these arrangements share the common feature that a mount or accommodation apparatus which is matched to the respective mobile telephone is required in order to achieve optimum coupling of the transmitting/receiving antenna of the mobile telephone to the coupling antenna with a connection to an external antenna.

Similarly, all of these arrangements and the arrangements described in EP 0 999 607 A2, EP 1 006 606 A1 and EP 1 170 822 A1 share the common feature that a flat antenna is fitted as close as possible and parallel to the rear wall of the mobile telephone in order to achieve a coupling loss which is as low as possible.

In EP 1 006 606 A1, this coupling antenna is oriented as exactly as possible toward the internal antenna of the mobile telephone. EP 1 170 822 A1 describes a structure which permits matching to the antenna in the mobile telephone with the broadest range possible.

At present, the mobile telephones have to be able to operate at different frequencies in order for it to be possible to use the mobile telephone internationally. For example, it is necessary to support GSM900, GSM1800 and UMTS2100, that is to say to operate at frequencies of 900 MHz, 1800 MHz and 2100 MHz, in order to make telephone calls throughout Europe.

In WO 2007/118694 A1, the coupling antenna which is intended to be installed in a vehicle has a helical structure in order to have multiband capability.

SUMMARY OF THE INVENTION

The object of the invention is to propose an arrangement having a coupling antenna by means of which a mobile telephone can be effectively coupled, without the mobile telephone having to be oriented toward or fixed to the coupling antenna to the exact millimeter.

The arrangement proposed here having an accommodation space and a special antenna structure of the coupling antenna permits coupling to the transmitting/receiving antenna of a mobile telephone independently of the orientation of the mobile telephone which is placed in the accommodation space. As a result, it is not necessary to make specific provisions in the mobile telephone or a mount in order to optimally orient the coupling antenna with respect to the transmitting/receiving antenna of the mobile telephone. Therefore, the arrangement according to the invention allows a mobile telephone from amongst a virtually unlimited number of mobile telephones to be effectively coupled to an external vehicle antenna by means of one coupling antenna.

This is achieved by essential parts of the coupling antenna being arranged perpendicular to the surface or rear wall of the mobile telephone and the antenna structure being of symmetrical design. A symmetrical structure of this kind provides a coupling antenna which has multiband capability and low levels of coupling loss.

A three-dimensional design of the antenna structure which fills up the space more than a planar antenna structure further improves the coupling result and makes the coupling result even more independent of the design and the positioning of the antenna which is installed in the mobile telephone since parts of the coupling antenna which are oriented in a different way are also available for coupling purposes as a result.

The invention also makes provision for the accommodation space to be equipped with a further antenna structure for wire-free energy transmission for charging the battery of the mobile telephone and/or an antenna for audio and data transmission to the vehicle in order to operate the mobile telephone, for example, in hands-free mode. For example, the audio and/or the data are transmitted wirelessly using a short wavelength UHF band transceiver, such as Bluetooth. As a result, a cable connection of the mobile telephone is entirely superfluous, even though the mobile telephone is used with all the conventional convenience features, good reception, charging of the energy storage means and hand-free operation.

Shielding of the accommodation space and/or of the space around the antenna structure may be advantageous. In order to transmit energy, for the purpose of charging the batteries of the mobile telephone, with low levels of loss, provision is made to interrupt and/or to slot this shielding means in a suitable manner in order to avoid eddy current losses.

Within the meaning of the invention, a symmetrical antenna structure is understood to mean an antenna structure which has two physically identical antenna parts in symmetrical arrangement.

BRIEF DESCRIPTION OF THE DRAWINGS

Further details of the invention are described in the drawings with reference to schematically illustrated exemplary embodiments.

DETAILED DESCRIPTION OF THE INVENTION

Figure 1:
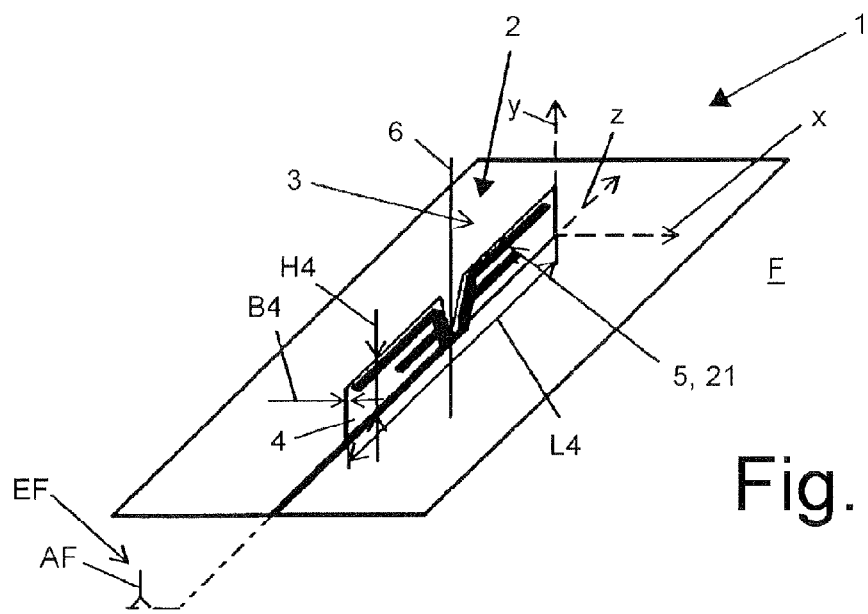
FIG. 1 shows a first antenna structure of an arrangement 1 according to the invention.

FIG. 1 shows, in a schematic illustration, a first antenna structure 2 of an arrangement 1 according to the invention. The antenna structure 2 is constructed on a printed circuit board 3 and comprises a flat, web-like antenna body 4. The antenna body 4 is symmetrical and comprises a conductor structure 5 which runs through the antenna body. The antenna structure 2 and the antenna body 4 together with its conductor structure 5 are symmetrical with respect to a line 6 of reflection. The antenna body 4, which substantially forms the antenna structure 2, has a width B4 in the x direction, a height H4 in the y direction and a length L4 in the z direction. According to the invention, provision is made to use the first antenna structure 2 in a vehicle F for coupling a mobile telephone and, in particular, to connect to an external antenna or AF of the vehicle F with the interposition of a signal-processing device or a signal-conditioning device and, in particular, an amplifier device. In this case, the external antenna AF is also called a device EF of the vehicle F.

Figure 2:
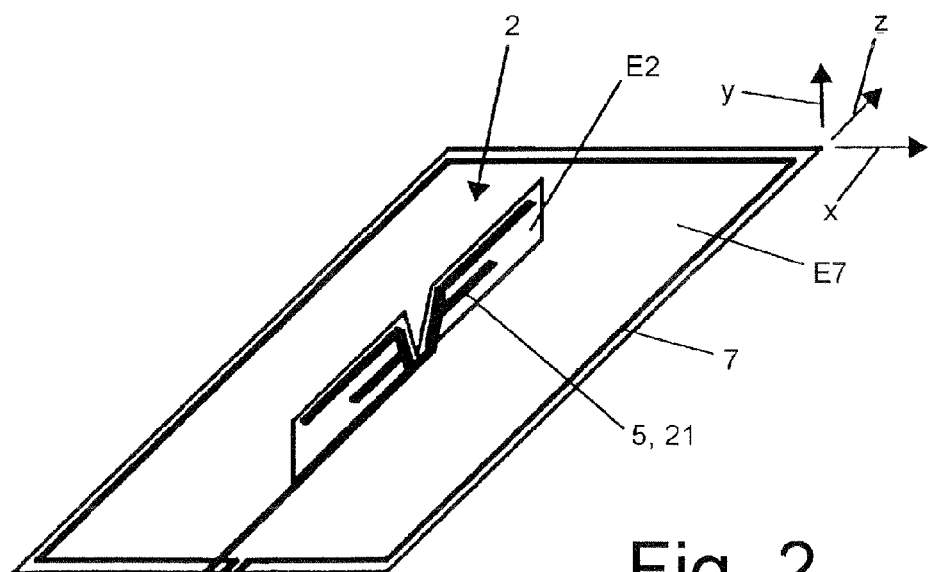
FIG. 2 shows the first antenna structure, which is shown in FIG. 1, with a second antenna structure which surrounds the first antenna structure.

FIG. 2 shows, in a schematic illustration, the first antenna structure 2, which is shown in FIG. 1, with a second antenna structure 7 which surrounds the first antenna structure and is intended to transmit energy to a mobile telephone (not illustrated). The second antenna structure 7 surrounds the first antenna structure 2 in the form of a ring and defines a plane E7. The first antenna structure 2 defines a further plane E2 in the z and y direction, wherein the two planes E2 and E7 are perpendicular to one another.

Figure 3:
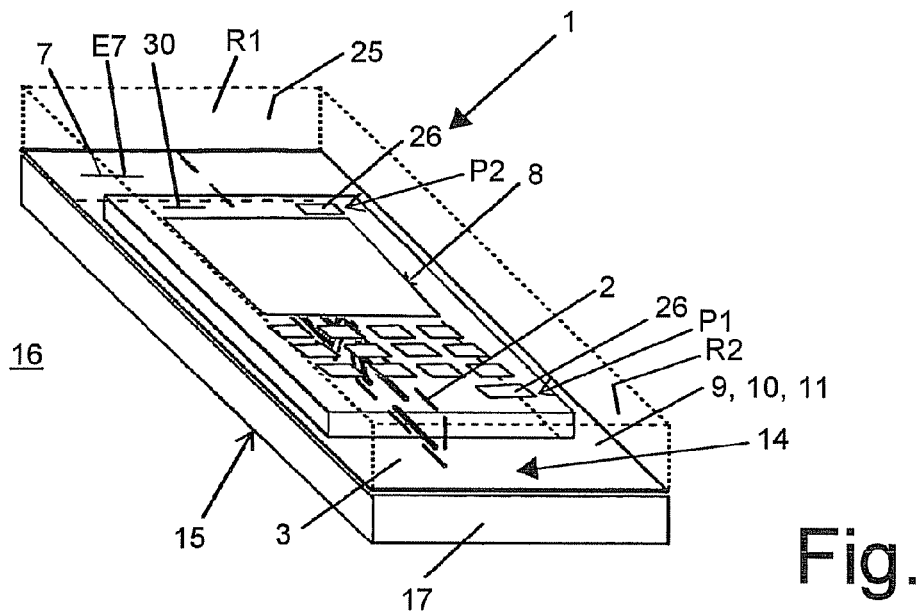
FIG. 3 shows the antenna structures, which are shown in FIG. 2, together with a mobile telephone.

FIG. 3 schematically illustrates the antenna structures 2 and 7 of the arrangement 1 according to the invention together with a mobile telephone 8 and a wall 10, which is designed as a base 9, of a container 11 (not illustrated in any more detail). The mobile telephone 8 rests with its rear face 12 (FIG. 5) on a surface 13 of the base 9, wherein the base 9 and the surface 13 are illustrated in a transparent manner in FIG. 3. The first symmetrical antenna structure 2 with its plane E2 is perpendicular to the surface 13 and to the rear face 12 of the mobile telephone 8 beneath the surface 13 and beneath the rear face 12 of the mobile telephone 8. On account of the symmetrical design of a first antenna structure 2 which forms a coupling antenna, broadband coupling of the mobile telephone 8 is possible both when an antenna 26 is arranged in the mobile telephone 8 in a position P1 which is indicated with solid lines and when the antenna 26 is arranged in the mobile telephone 8 in a position P2 which is indicated with dashed lines. That is to say, broadband coupling of the antenna 26 of the mobile telephone 8 is independent of whether the antenna 26 of the mobile telephone 1 is located in a first half R1 or in a second half R2 of an accommodation space 25 which is situated above the base 9. This ensures broadband coupling of the mobile telephone 8 independently of its orientation in the accommodation space 25 and independently of the positioning of the antenna 26 of the mobile telephone 8 in the mobile telephone 8. An antenna space 14, which is situated beneath the surface 13 and in which the antenna structure 2 is arranged, is shielded from the surrounding area 16 by a shield or a shielding means 15. In this case, the shield 15 forms, in particular, a pan 17 around the antenna structure 2 which operates as a coupling antenna. Only a detail of the antenna structure 7 is shown in FIG. 3. The antenna structure runs within the shield 15—as is known from FIG. 2—around the antenna structure 2. The imaginary plane E7, in which the antenna structure 7 is situated, is parallel to the surface 13 and to the rear face 12 of the mobile telephone 8. In order to absorb the energy which is emitted by the second antenna structure 7, the mobile telephone 8 has a schematically indicated antenna 30 which receives energy.

Figure 4:
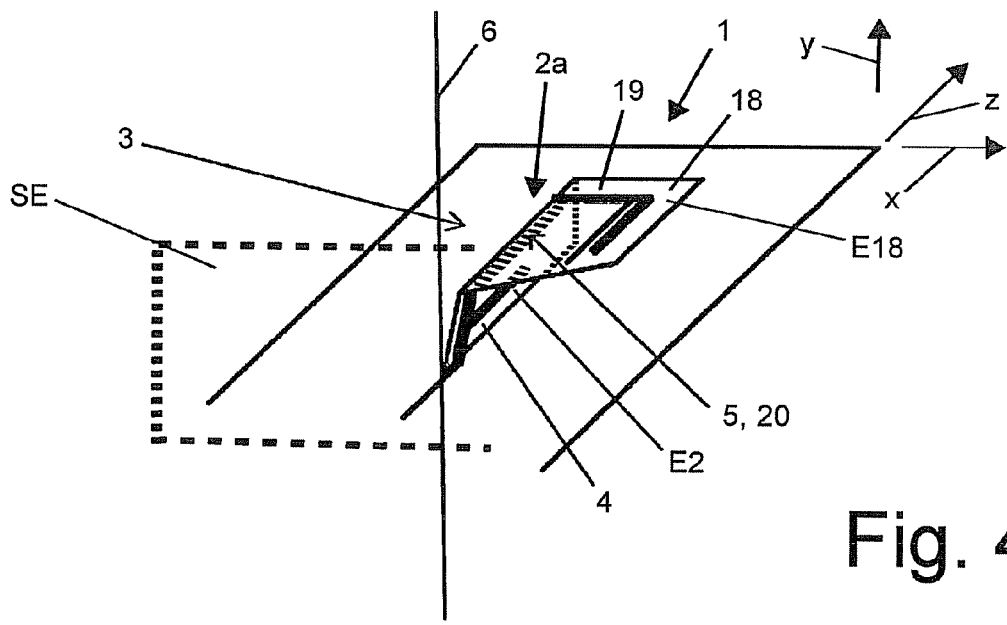
FIG. 4 shows a variant embodiment to the first antenna structure which is shown in FIGS. 1 to 3.

FIG. 4 shows, schematically and in the form of a detail, a variant embodiment of a first antenna structure 2a for an arrangement 1 according to the invention. The antenna structure 2a is designed as a three-dimensional antenna structure and comprises, in addition to a flat, web-like first antenna body 4, a second wing-like antenna body 18. A further, third antenna body (not illustrated) of the antenna structure 2a is arranged in a mirror-inverted manner with respect to a line 6 of reflection. The two additional antenna bodies 18 are connected to the first, web-like antenna body 4, which extends in a mirror-inverted manner with respect to the line 6 of reflection, and form wings 19 which, by way of their plane E 18, lie in the xz plane and therefore are arranged perpendicular to the first antenna body 4 which extends in the yz plane. A conductor structure 5 which splits off in the manner of a branch extends from the line 6 of reflection, over the first antenna body 4 and the wing-like antenna body 18. In the case of the antenna structure 2 according to FIG. 4, the conductor structure 5 forms a spatial or three-dimensional conductor structure 20. In contrast to this, the conductor structure 5 forms a kind of flat or planar conductor structure 21 in the case of the first variant embodiment shown in FIGS. 1 to 3 of a second antenna body. According to a variant embodiment which is not illustrated, the third antenna body is designed in a mirror-inverted manner in relation to a plane SE of reflection which perpendicularly intersects the plane E2 which is defined by the first antenna body 4.

Figure 5:
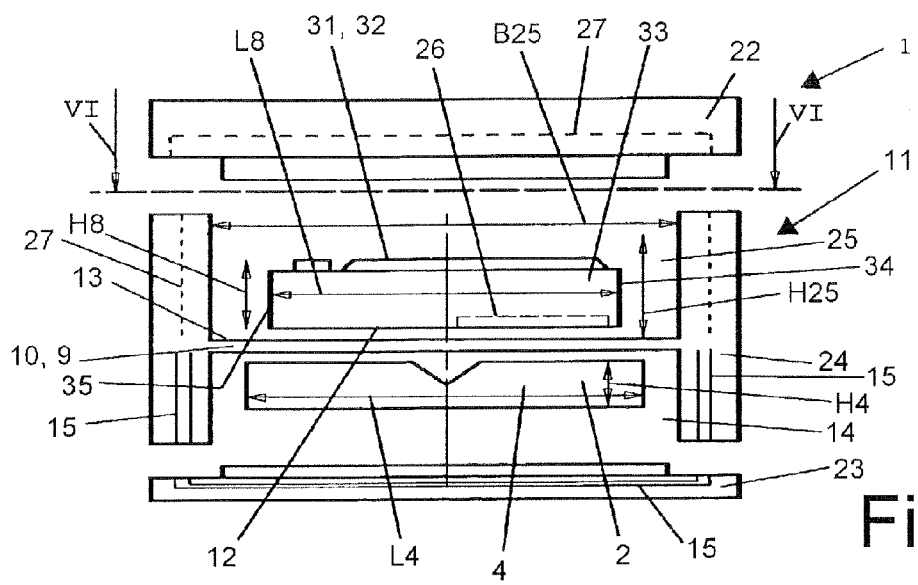
FIGS. 5-8 show different views of a further arrangement according to the invention.
Figure 6:
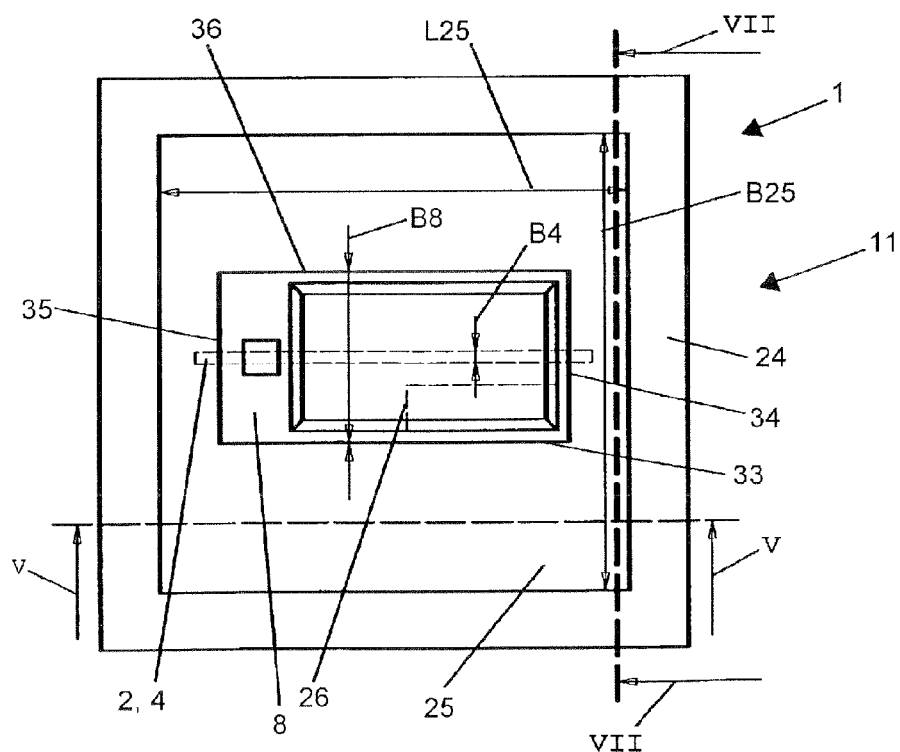
Figure 7:
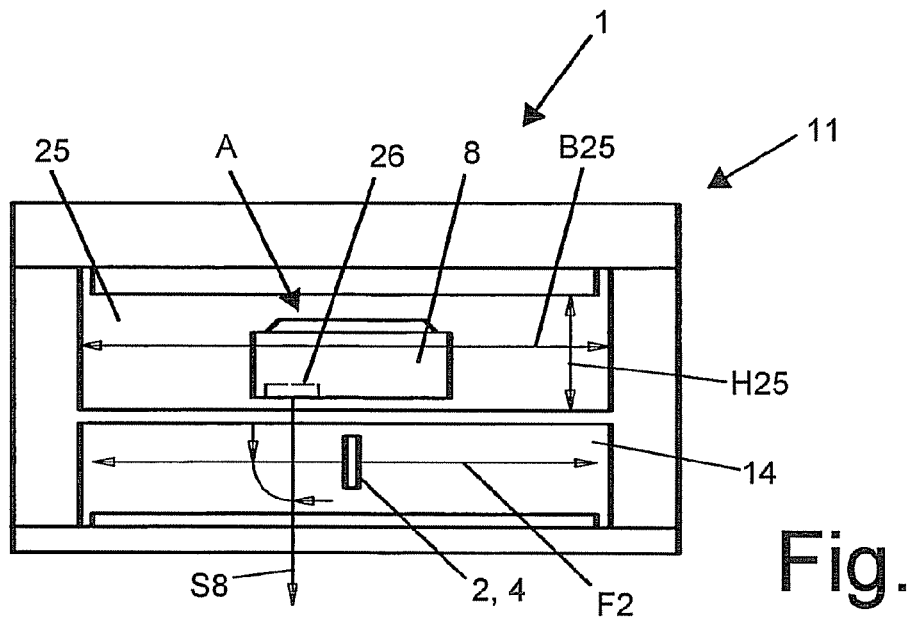

FIGS. 5 to 8 schematically illustrate different views of a further arrangement 1 according to the invention. FIG. 5 shows a section in accordance with the section line V-V, shown in FIG. 6, through a container 11. In this case, the hatching of sectioned areas has been removed in FIG. 5 and in FIGS. 6 to 8 in order to maintain the clarity of the illustrations. In addition, covers 22, 23 which can be removed are further shown in FIG. 5, it being possible to use the covers to close a body 24 of the container 11. The body 24 and the covers 22 and 23 form the container 11. The container 11 comprises an accommodation space 25 for a mobile telephone 8 and an antenna space 14 for a first antenna structure 2. FIG. 7 shows the container 11 with the covers 22 and 23 fitted. The covers 22 and 23 are shown in a raised position in FIG. 4. In order to form the accommodation space 25 and the antenna space 14, the container 11 comprises a wall 10 which is in the form of a base 9 in the present configuration. The mobile telephone 8 rests on a surface 13 of the base 9 by way of a rear face 12. In the schematic illustration, a distance between the rear face 12 and the surface 13 serves only to allow the rear face 12 to be clearly labelled. In the actual embodiment, the mobile telephone 8 rests on the surface 13. In addition to the rear face 12, the mobile telephone 8 has a display face 31 and operator control face 32 which are situated opposite the rear face. The mobile telephone 8 also has side faces 33 to 36 which are arranged between the rear face 12 and the display face 31. Dashed lines indicate an antenna 26 of the mobile telephone 8. As can be seen by looking at FIG. 5 and FIG. 6 together, with FIG. 6 showing a section in accordance with the section line VI-VI through the illustration of FIG. 5, the mobile telephone 8 can be freely positioned by way of its rear face 12 on the surface 13 of the base 9 in the accommodation space 25, with the result that a user does not have to pay any attention to the orientation of the mobile telephone 8 when placing the mobile telephone 8 in the accommodation space. The accommodation space 25 has a width B25, a height H25 and a length L25. The mobile telephone 98 has a width B8, a height H8 and a length L8. The first planar antenna structure 2 has, with an antenna body 4, a width B4, a height B4 and a length L4 and extends, by way of the length L4, over at least 50% of the length L25 of the accommodation space 25 and preferably over at least 70% of the length L25 of the accommodation space. FIG. 5 shows a plan view of how the antenna 26 of the mobile telephone 8 and the antenna structure 2 which is in the form of a coupling antenna are positioned in relation to one another. A shielding means 27 of the accommodation space 25 is schematically indicated with dashed lines in FIG. 5, the shielding means 27 encasing the mobile telephone 8 like an inverted pan. A shield 15 of the antenna space 14 is furthermore schematically indicated with a double line 15. The shield 15 encases the antenna space 14 in the manner of a pan.

Figure 8:
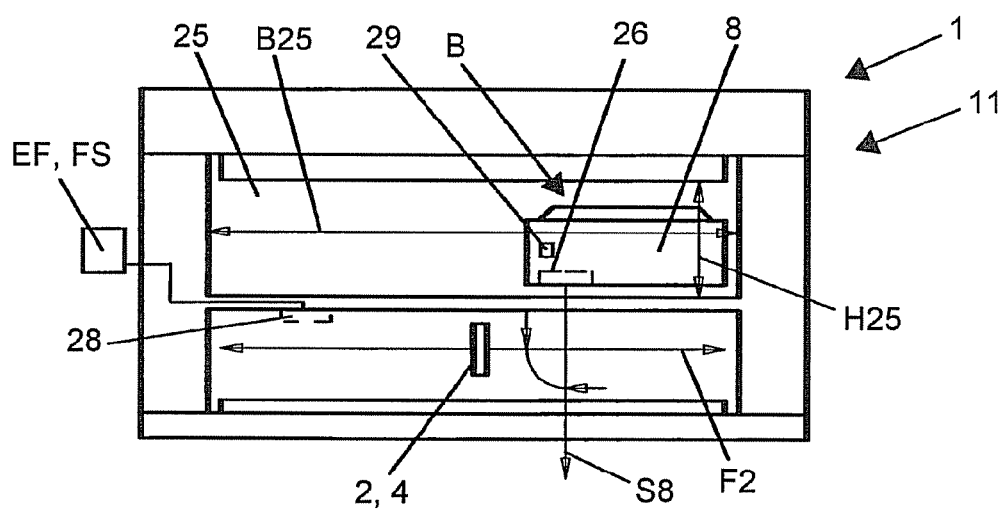

FIG. 7 shows a sectional view through the illustration of FIG. 6 in accordance with the section line VII-VII shown in the figure. This view shows, in a simplified, schematic and idealized illustration, how the antenna 26 of the mobile telephone 8 emits radiation in an arrow direction S8 and the arrow S8 intersects, at a right angle, a field F2 which is formed around the antenna structure 2 in the antenna space 14. Measurements have shown that a spatial orientation of the mobile telephone and the planar, symmetrical coupling antenna in this way can result in good coupling which is largely independent of the exact orientation of the mobile telephone 8 in the accommodation space 25, with the result that the mobile telephone 8 can also be moved, for example, from a first position A, which the mobile telephone assumes in the illustration of FIG. 7, to a second position B, which is shown in FIG. 8, without a significant change in the quality of the coupling being measured. A quality of the coupling which is independent of the orientation of the mobile telephone could also be determined with measurements for different mobile telephones. FIG. 8 shows, by way of example, a further additional, third antenna structure 28 of the arrangement 1, which antenna structure is connected to a device EF of the vehicle, the device being in the form of, for example, a hands-free device FS. Data and/or audio signals, for example for use of the hands-free device or for use of a display which is arranged in the vehicle or for receiving control signals which are generated in the vehicle, are transmitted between the third antenna structure 28 and the antenna 29 of the mobile telephone 8.

It goes without saying that the invention also makes provision for the accommodation space to be arranged in an inclined or upright manner. An overhead arrangement, for example for use in aircraft, is also provided according to the invention.

The invention is not restricted to the illustrated or described exemplary embodiments. Rather, the invention comprises developments of the invention within the scope of the claims.

LIST OF REFERENCE SYMBOLS

1 Arrangement
2, 2a First antenna structure (in the form of a coupling antenna for mobile radio)
3 Printed circuit board
4 Antenna body of 2
5 Conductor structure in 4
6 Line of reflection
7 Second antenna structure (for energy transmission)
8 Mobile telephone
9 Base
10 Wall
11 Container
12 Rear face of 8
13 Surface of 9 and 10
14 Antenna space
15 Shield
16 Surrounding area
17 Pan
18 Second antenna body of 2
19 Wing
20 Spatial conductor structure
21 Flat or planar conductor structure
22 Cover of 11
23 Cover of 11
24 Body of 11
25 Accommodation space for 8
26 Antenna of 8
27 Shielding means of the accommodation space 25
28 Third antenna structure of 1 for the transmission of data and audio signals
29 Further antenna of 8 for the transmission of data and audio signals
30 Energy-receiving antenna of 8
31 Display face of 8
32 Operator control face of 8
33-36 Side face of 8
37 Body which has an L-shaped cross section
AF External antenna of a vehicle
S8 Radiation emission direction of 26 from 8
E2 Plane defined by 2
E7 Plane defined by 7
E18 Plane defined by 18
EF Device of the vehicle
F Vehicle
F2 Field of 2 and 4
FS Hands-free device
P1, P2 Position of 26 in 8
R1, R2 Half of 25
SE Plane of reflection
B4 Width of 4
H4 Height of 4
L4 Length of 4
x, y, z Direction in space

I claim:

1. An arrangement, in particular a mobile telephone coupling arrangement, for coupling an antenna, which is in the form of at least one of a transmitting and receiving antenna, of a mobile telephone from a plurality of different mobile telephones to an external antenna of a vehicle with low levels of loss and interference radiation, the arrangement comprising:
   a first antenna structure comprising at least an antenna body for wireless transmission signals to and from the antenna of the mobile phone, wherein the first antenna structure wirelessly transmits and receives signals on at least one mobile communications frequency; and
   a receptacle having an accommodation space spatially dimensioned so that mobile phones of different dimensions can be placed against a wall of the accommodation space, wherein said wall is a bottom wall of the accommodation space, and the first antenna structure is arranged below a surface of said wall of the accommodation space, wherein the antenna body has a flat web-like shape having a width B4, a height H4, and a length L4, the length L4 extending substantially parallel to the surface of said wall of the accommodation space, and the height H4 extending in a direction orthogonal to the surface of said wall of the accommodation space, wherein the height H4 is a multiple of the width B4 of the antenna body, and the length L4 is a multiple of the height H4 of the antenna body, wherein a conductive structure extends through the antenna body of the first antenna structure and centrally intersects the first antenna structure with respect to the length L4 and the width B4, and the first antenna structure is symmetrical with respect to the antenna body, when the symmetry is observed with respect to a line of reflection and a mirror image inverted plane of reflection, which are orthogonal to said wall against which the mobile phone is placed, and wherein the arrangement forms a three-dimensional, symmetrical antenna structure for coupling the antenna of the mobile telephone with a low level of loss independent of the position of the mobile telephone in the accommodation space.

2. The arrangement as claimed in claim 1, wherein the accommodation space for the mobile telephone further comprises a shielding means, and the three-dimensional, symmetrical antenna structure, which is in the form of a coupling antenna, is arranged within the shielding means.

3. The arrangement as claimed in claim 1, wherein the arrangement further comprises a second antenna structure which is matched to a frequency for a wire-free transmission of energy for charging a battery of the mobile telephone;

wherein the accommodation space includes at least a partial shielding means, and a third antenna structure for the transmission of data and audio signals to operate the mobile telephone in a hands-free mode.

4. A mobile telephone accommodation arrangement for accommodating a mobile telephone from amongst a large number of different mobile telephones in a vehicle and for coupling the mobile telephone to devices of the vehicle, in particular to an external antenna and/or a hands-free device of the vehicle, the arrangement comprising:

a first antenna structure for the wire-free transmission of signals to and from the transmit/receive antenna of the mobile telephone; and a second antenna structure for transmitting energy to the mobile telephone having a ring shape that substantially surrounds the first antenna structure, wherein a container having an accommodation space which is physically dimensioned in such a way that mobile telephones of different dimensions can be placed on and removed from one of a wall and a base of the accommodation space;

the first antenna structure is arranged beneath a surface of the wall of the accommodation space, the first antenna structure comprises a flat web-like antenna body which has a length that runs approximately parallel to the surface of the wall, which has a width that runs approximately parallel to the surface of the wall, and which has a height that is approximately perpendicular to the surface of the wall, wherein the first antenna structure transmits and receives on a mobile radio frequency, and wherein the second antenna structure runs through adjacent walls of the container and surrounds the accommodation space, wherein energy is transmitted from the vehicle to the mobile telephone by way of the second antenna structure inductively in the near field, wherein an imaginary plane which is defined by the second antenna structure is oriented parallel to the rear face of the mobile telephone which is located in the accommodation space.

5. The arrangement as claimed in claim 4, wherein the second antenna structure is arranged in such a way that a maximum distance, which is dependent on the transmission frequency, from the mobile telephone and an antenna, which receives the energy, is maintained.

6. The arrangement as claimed in claim 4, wherein the web-like antenna body of the first antenna structure is arranged perpendicularly beneath the surface of the wall of the accommodation space, and perpendicularly opposite or beneath a mobile telephone which is located in the accommodation space to avoid parallel orientation with respect to the antenna of the mobile telephone and to avoid matching to the position, orientation and structure of the antenna of the mobile telephone, wherein the web-like antenna body is oriented perpendicular to an antenna of the mobile telephone, and wherein the antenna of the mobile telephone and the flat antenna body are arranged in such a way that a corresponding minimum distance and a corresponding maximum distance is ensured between said components.

7. The arrangement as claimed in claim 4, wherein a height of the web-like body of the antenna structure is a multiple of a width of the web-like body of the antenna structure, and a length of the web-like body of the antenna structure is a multiple of the height of the web-like body of the antenna structure.

8. The arrangement as claimed in claim 4, wherein the mobile telephone one of:

rests on the surface of the wall of the accommodation space by way of a rear face which is situated opposite a display face or operator control face, rests on the surface of the wall of the accommodation space by way of a display face or operator control face which is situated opposite a rear face, and rests on the surface of the wall of the accommodation space by way of a side face which is close to the antenna of the mobile telephone and is formed between a display face or operator control face and a rear face, during operation of the arrangement.

9. The arrangement as claimed in claim 4, wherein the accommodation space has dimensions that are larger than and extend beyond the mobile telephone in such a way that said mobile telephone can be placed in the accommodation space with any desired orientation.

10. The arrangement as claimed in claim 4, wherein the antenna of the mobile telephone and the flat web-like antenna body of the first antenna structure are located in one of a near field, a limit region between a near field and a far field, and a far field in relation to the wavelength of the transmitted waves.

11. The arrangement as claimed in claim 4, wherein the first antenna structure comprises, in addition to the first flat, web-like antenna body, at least one second antenna body which forms a wing on the first antenna body, said wing extending approximately parallel to the surface of the wall, wherein the first and second antenna bodies further comprise a conductor structure which runs through the first and second antenna bodies, and wherein the first and the second antenna bodies form a body which has an L-shaped cross section.

12. The arrangement as claimed in claim 4, wherein the first antenna structure is symmetrical, in relation to one of the first antenna body, and all the antenna bodies, when the symmetry is viewed in relation to at least one of a line of reflection and a mirror image inverted plane of reflection which are perpendicular to the wall against which the mobile telephone rests, and intersect the first antenna structure in a center in relation to the length and width thereof.

13. The arrangement as claimed in claim 4, wherein the arrangement further comprises a third antenna structure for the wire-free transmission of data and audio signals, via one of a UHF band wireless transceiver connection, a low-energy UHF band wireless transceiver connection, and an infrared connection.

14. The arrangement as claimed in claim 4, wherein the first antenna structure further comprises at least one further antenna body which is arranged at a right angle to the first antenna body and forms a three-dimensional antenna structure with said first antenna body, and wherein the further antenna body defines a plane which is oriented parallel to the base of the accommodation space.

15. The arrangement according to claim 9, wherein an orientation of the mobile telephone is one of a rear face resting on the surface of the wall of the accommodation space, a display face/operator control face of the mobile telephone resting on the surface of the wall of the accommodation space, and a side face of the mobile telephone resting on the surface of the wall of the accommodation space.

16. A mobile telephone coupling arrangement to an external antenna comprising:
  a mobile telephone having a transmit/receive antenna;
  an external antenna;
  an accommodation space;
  a three-dimensional antenna structure; and
  a second antenna structure for transmitting energy to the mobile telephone having a ring shape that substantially surrounds the three-dimensional antenna structure, wherein
  the accommodation space is physically dimensioned to be larger and extend beyond the mobile telephone having the transmit/receive antenna so that the mobile telephone can be placed at any position in the accommodation space, the accommodation space consisting of a pair of opposing side walls, a pair of opposing end walls that connect the pair of opposing side walls and a base wall that connects to the pair of opposing side walls and the pair of opposing end walls,
  the second antenna structure runs through adjacent walls of the container and surrounds the accommodation space, wherein energy is transmitted from the vehicle to the mobile telephone by way of the second antenna structure inductively in the near field, wherein an imaginary plane which is defined by the second antenna structure is oriented parallel to the rear face of the mobile telephone which is located in the accommodation space,
  the three dimensional antenna structure couples the external antenna to the transmit/receive antenna of the mobile telephone when the mobile telephone is placed in the accommodation space, and
  the coupling between the transmit/receive antenna of the mobile telephone and the external antenna has low levels of loss and interference radiation independent of a position of the mobile telephone in the accommodation space.

\* \* \* \* \*